(12) United States Patent
Lee et al.

(10) Patent No.: US 10,186,380 B2
(45) Date of Patent: Jan. 22, 2019

(54) CAPACITOR COMPONENT

(71) Applicant: SAMSUNG ELECTRO-MECHANICS CO., LTD., Suwon-si, Gyeonggi-do (KR)

(72) Inventors: Taek Jung Lee, Suwon-si (KR); Hyo Youn Lee, Suwon-si (KR); Won Young Lee, Suwon-si (KR); Sung Kwon An, Suwon-si (KR); Jae Yeol Choi, Suwon-si (KR); Jin Kyung Joo, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/485,555

(22) Filed: Apr. 12, 2017

(65) Prior Publication Data

US 2018/0068793 A1    Mar. 8, 2018

(30) Foreign Application Priority Data

Sep. 8, 2016 (KR) .................. 10-2016-0115759

(51) Int. Cl.
| | |
|---|---|
| *H01G 4/30* | (2006.01) |
| *H01G 4/232* | (2006.01) |
| *H01G 4/012* | (2006.01) |
| *H01G 4/236* | (2006.01) |
| *H01G 2/06* | (2006.01) |

(52) U.S. Cl.
CPC .............. *H01G 4/30* (2013.01); *H01G 2/065* (2013.01); *H01G 4/012* (2013.01); *H01G 4/232* (2013.01); *H01G 4/236* (2013.01)

(58) Field of Classification Search
CPC .......... H01G 4/30; H01G 2/065; H01G 4/012; H01G 4/232; H01G 4/236
See application file for complete search history.

(56) References Cited

U.S. PATENT DOCUMENTS

| | | | | |
|---|---|---|---|---|
| 7,764,484 B2* | 7/2010 | Motoki | .................. | H01G 4/232 |
| | | | | 361/306.1 |
| 7,933,113 B2* | 4/2011 | Motoki | .................. | H01G 4/232 |
| | | | | 361/306.3 |
| 8,605,410 B2* | 12/2013 | Oikawa | .................. | H01G 4/005 |
| | | | | 29/25.03 |

(Continued)

FOREIGN PATENT DOCUMENTS

| | | |
|---|---|---|
| JP | 2013-135179 A | 7/2013 |
| JP | 5456060 B2 | 3/2014 |

*Primary Examiner* — Dion Ferguson
(74) *Attorney, Agent, or Firm* — McDermott Will & Emery LLP (57) ABSTRACT

A capacitor component includes a body, a plurality of internal electrodes disposed in the body, connection electrodes extended in a thickness direction of the body and electrically connected to the plurality of internal electrodes, upper electrodes disposed on an upper surface of the body and electrically connected to the connection electrodes, and lower electrodes disposed on a lower surface of the body and electrically connected to the connection electrodes A thickness of the upper electrodes is different from that of the lower electrodes, and an area of contact between the upper electrodes and the body is different from an area of contact between the lower electrodes and the body.

20 Claims, 5 Drawing Sheets

(56) References Cited

U.S. PATENT DOCUMENTS

| | | | | |
|---|---|---|---|---|
| 8,631,549 B2* | 1/2014 | Motoki | ................ | H01G 4/232 |
| | | | | 29/25.03 |
| 9,831,039 B2* | 11/2017 | Namikawa | ............... | H01G 4/33 |
| 9,875,848 B2* | 1/2018 | Berdy | ..................... | H01G 4/30 |
| 2006/0198079 A1* | 9/2006 | Shim | ....................... | H01G 2/06 |
| | | | | 361/306.3 |
| 2007/0138633 A1* | 6/2007 | Amey, Jr. | ............. | H01G 4/232 |
| | | | | 257/728 |
| 2009/0284896 A1* | 11/2009 | Sakaguchi | ............ | H01G 4/005 |
| | | | | 361/303 |
| 2010/0246092 A1* | 9/2010 | Shibue | .................. | H01G 4/232 |
| | | | | 361/313 |
| 2010/0321860 A1* | 12/2010 | Osawa | ................... | H01G 4/012 |
| | | | | 361/303 |
| 2011/0128669 A1* | 6/2011 | Yano | ..................... | H01G 4/005 |
| | | | | 361/312 |
| 2012/0241906 A1 | 9/2012 | Nakanishi | | |
| 2013/0258545 A1* | 10/2013 | Yano | ..................... | H01G 4/306 |
| | | | | 361/301.4 |
| 2016/0049253 A1* | 2/2016 | Mukobata | ............... | H01G 4/30 |
| | | | | 361/301.4 |

* cited by examiner

CAPACITOR COMPONENT

CROSS-REFERENCE TO RELATED APPLICATION(S)

This application claims the benefit of priority to Korean Patent Application No. 10-2016-0115759 filed on Sep. 8, 2016 in the Korean Intellectual Property Office, the entire disclosure of which is incorporated herein by reference.

BACKGROUND

1. Technical Field

The present disclosure relates to a capacitor component.

2. Description of Related Art

A multilayer ceramic capacitor, a type of capacitor component, is a chip type condenser mounted on the printed circuit boards of several electronic products such as image display devices including liquid crystal displays (LCD), plasma display panels (PDP), and the like, as well as computers, smartphones, cellular phones, and the like, serving to charge electricity therein or discharge electricity therefrom. The multilayer ceramic capacitor (MLCC) may be used as a component of various electronic devices due to advantages thereof such as small size, high capacitance and ease of mounting.

Recently, a multilayer ceramic capacitor having high capacitance and good reliability has been developed. In order to implement a high capacitance capacitor, a method of increasing permittivity of a material configuring a capacitor body or thinning dielectric layers and internal electrodes to increase the number of stacked dielectric layers and internal electrodes may be used.

However, since it may not be easy to develop a composition of a high-permittivity material, and there may be limitations in decreasing the thickness of the dielectric layer in a current process, there may be limitations in increasing capacitance of a product using the above-mentioned method. Therefore, in order to increase capacitance of the product while satisfying the demand for increased miniaturization of the capacitor, research into a method of increasing an area of overlap between internal electrodes having different polarities has been required. Further, as a mounting density of a board is increased, an attempt to decrease amounting area and a mounting height of the capacitor has been undertaken.

SUMMARY

An aspect of the present disclosure may provide a capacitor component which is advantageous for improvement of distinguishability and miniaturization and has excellent bending properties at the time of mounting the capacitor component on a board, or the like.

According to an aspect of the present disclosure, a capacitor component may include a body, a plurality of internal electrodes disposed in the body, connection electrodes extended in a thickness direction of the body and electrically connected to the plurality of internal electrodes, upper electrodes disposed on an upper surface of the body and electrically connected to the connection electrodes, and lower electrodes disposed on a lower surface of the body and electrically connected to the connection electrodes. A thickness of the upper electrodes is different from that of the lower electrodes, and an area of contact between the upper electrodes and the body is different from an area of contact between the lower electrodes and the body.

Volumes of the upper and lower electrodes may be the same as each other.

The area of contact between the upper electrodes and the body may be smaller than the area of contact between the lower electrodes and the body.

The upper electrode may be thicker than the lower electrode.

A surface of the lower electrode contacting the body may have a tetragonal shape.

A surface of the upper electrode contacting the body may have a circular shape.

The upper and lower electrodes may be formed of the same material.

The upper electrode may have a stripe shape.

The upper electrode may include a dummy electrode that is not electrically connected to the connection electrode.

The connection electrode may penetrate through the body.

The internal electrode may include a plurality of first and second internal electrodes disposed alternately.

The connection electrode may include first and second connection electrodes electrically connected to the first and second internal electrodes, respectively.

The second connection electrode may penetrate through the first internal electrode and may not be electrically connected to the first internal electrode.

According to another aspect of the present disclosure, a capacitor component may include a body, a plurality of internal electrodes disposed in the body, connection electrodes extended in a thickness direction of the body and electrically connected to the plurality of internal electrodes, upper electrodes disposed on an upper surface of the body and electrically connected to the connection electrodes, and lower electrodes disposed on a lower surface of the body and electrically connected to the connection electrodes, wherein an area of contact between the upper electrodes and the body is the same as an area of contact between the lower electrodes and the body, and the upper and lower electrodes have different shapes from each other.

Thicknesses of the upper and lower electrodes may be the same as each other.

Volumes of the upper and lower electrodes may be the same as each other.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
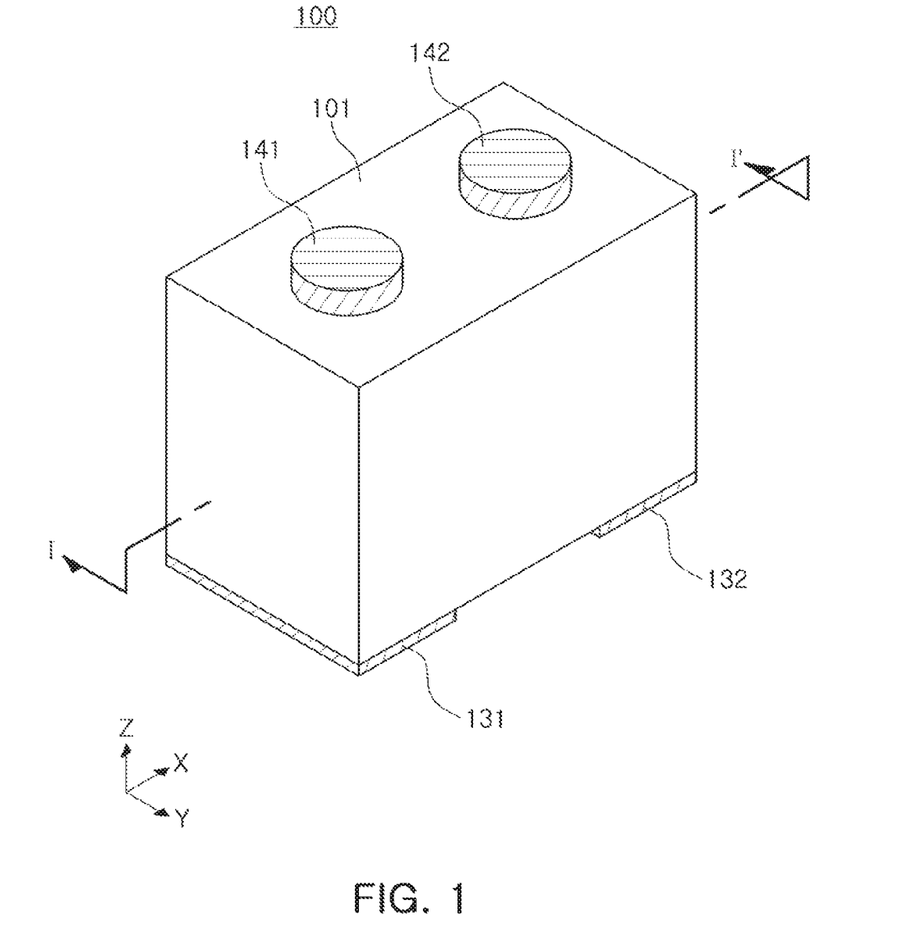
FIG. 1 is a perspective view schematically illustrating a capacitor component according to an exemplary embodiment in the present disclosure.
Figure 2:
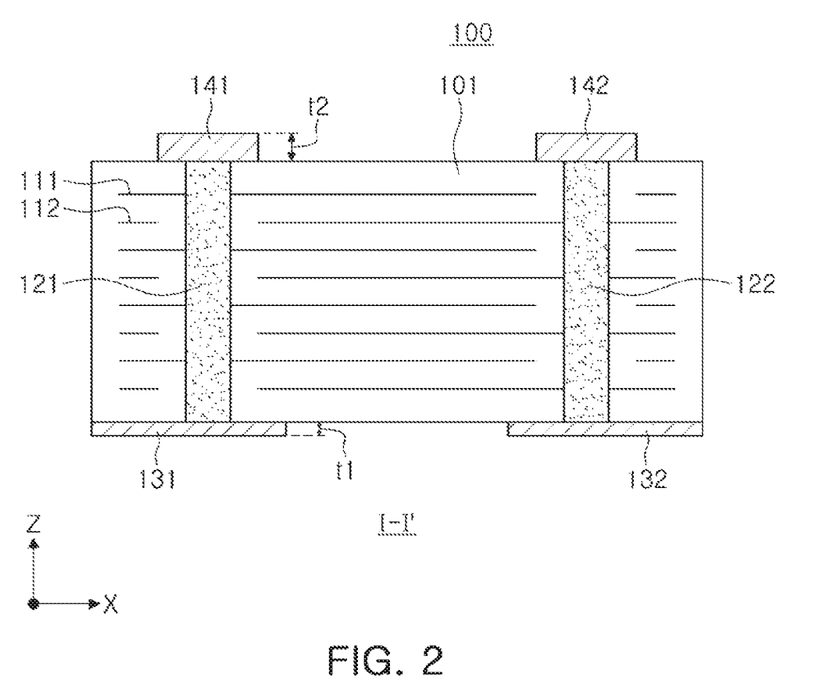
FIG. 2 is a cross-sectional view illustrating the capacitor component of FIG. 1.
Figure 3:
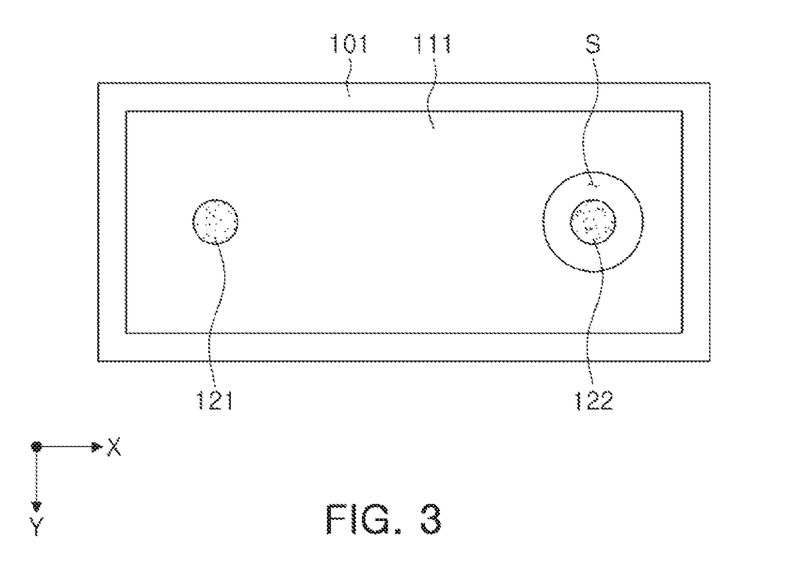
FIG. 3 illustrates shapes of an internal electrode and a connection electrode in the capacitor component of FIG. 1.
Figure 4:
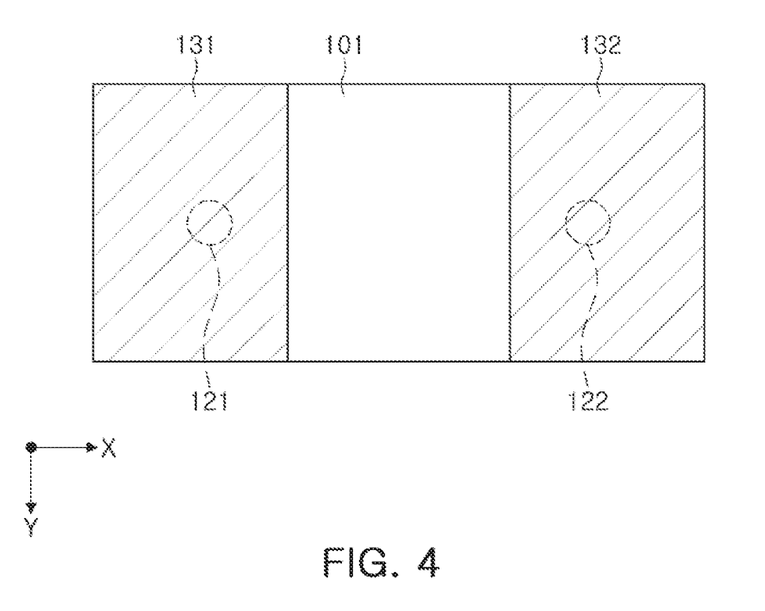
FIG. 4 illustrates shapes of a lower electrode and surroundings thereof in the capacitor component of FIG. 1.
Figure 5:
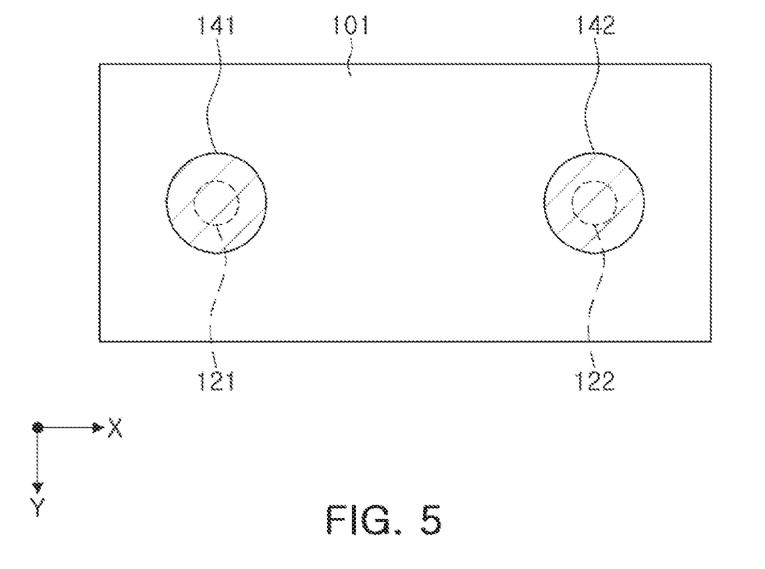
FIG. 5 illustrates shapes of an upper electrode and surroundings thereof in the capacitor component of FIG. 1.

FIG. 1 is a perspective view schematically illustrating a capacitor component according to an exemplary embodiment in the present disclosure. FIG. 2 is a cross-sectional view illustrating the capacitor component of FIG. 1. FIG. 3 illustrates shapes of an internal electrode and a connection electrode in the capacitor component of FIG. 1. FIG. 4 illustrates shapes of a lower electrode and surroundings thereof in the capacitor component of FIG. 1, and FIG. 5 illustrates shapes of an upper electrode and surroundings thereof in the capacitor component of FIG. 1.

Referring to FIGS. 1 through 5, a capacitor component 100 according to an exemplary embodiment in the present disclosure may include a body 101, a plurality of internal electrodes 111 and 112, connection electrodes 121 and 122, lower electrodes 131 and 132, and upper electrodes 141 and 142. In this case, the upper electrodes 141 and 142 and the lower electrodes 131 and 132 may have thicknesses different from each other, and an area of contact between the upper electrodes 141 and 142 and the body 101 may be different from an area of contact between the lower electrodes 131 and 132 and the body 101.

According to the present exemplary embodiment, the plurality of internal electrodes 111 and 112 will be referred to as first and second internal electrodes 111 and 112, respectively, and among the connection electrodes 121 and 122, a connection electrode electrically connected to the first internal electrodes 111 will be referred to as a first connection electrode 121 and a connection electrode electrically connected to the second internal electrodes 112 will be referred to as a second connection electrode 122.

The body 101 may be formed by stacking a plurality of dielectric layers, and the dielectric layers as described above may be formed using ceramics, or the like, known in the art. For example, the body 101 may be formed by sintering green sheets containing barium titanate ($BaTiO_3$) based ceramic material, or the like. In this case, an example of a barium titanate ($BaTiO_3$) based ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which calcium (Ca), zirconium (Zr), or the like, is partially solid-dissolved in $BaTiO_3$. However, the example of the barium titanate ($BaTiO_3$) based ceramic powder is not limited thereto.

The first and second internal electrodes 111 and 112 may have different polarities, be disposed alternately, and be formed by a method of printing a conductive paste on ceramic green sheets, or the like. The first and second internal electrodes 111 and 112 may be formed of a material such as nickel (Ni), copper (Cu), palladium (pd), or alloys thereof, or the like. In addition, a method of printing the conductive paste may be a screen printing method, a gravure printing method, or the like. However, the method of printing the conductive paste according to the present disclosure is not limited thereto.

The first and second connection electrodes 121 and 122 may be extended in the thickness direction of the body 101 (a Z-axis direction in FIG. 2) and electrically connected to the first and second internal electrodes 111 and 112, respectively, and may be formed to penetrate through the body 101 as illustrated in FIGS. 2 and 3. The through-hole type connection electrodes 121 and 122 as described above may be formed to penetrate through internal electrodes that are not electrically connected thereto among the internal electrodes 111 and 112. In other words, as illustrated in FIG. 3, the second connection electrode 122 may penetrate through the first internal electrode 111 but may not be electrically connected to the first internal electrode 111, that is, an insulating space S may be present between the second connection electrode 122 and the first internal electrode 111. Similarly, the first connection electrode 121 may penetrate through the second internal electrodes 112 but may not be electrically connected to the second internal electrodes 112.

Meanwhile, the first and second connection electrodes 121 and 122 may be formed by forming holes in the body 101 and the internal electrodes 111 and 112 and filling a conductive material in the holes. This conductive material may be filled by applying a conductive paste or using a plating method, or the like. In this case, holes of the body 101 may be formed by performing a laser processing method, a punching method, or the like, on the ceramic green sheets. Alternatively, the holes of the body 101 may be formed by processing holes in a laminate after being sintered.

The lower electrodes 131 and 132 may be disposed on a lower surface of the body 101 and electrically connected to the connection electrodes 121 and 122, respectively. In this case, the lower electrodes 131 and 132 may be provided as regions for mounting the capacitor component 100 on a board, or the like, and the lower electrodes 131 and 132 may have a multilayer structure. However, there is no need to provide the lower electrodes 131 and 132 as the mounting regions, but the capacitor component 100 may be mounted using the upper electrodes 141 and 142.

The upper electrodes 141 and 142 may be disposed on an upper surface of the body 101 and electrically connected to the connection electrodes 121 and 122, respectively. Although not essential, the upper electrodes 141 and 142 may have the same material and the same stacked structure as those of the lower electrodes 131 and 132.

As described above, the thickness of the upper electrodes 141 and 142 may be different from the thickness of the lower electrodes 131 and 132, and the area of contact between the upper electrodes 141 and 142 and the body 101 may be different from the area of contact between the lower electrodes 131 and 132 and the body 101. According to the present exemplary embodiment, the area of contact between the upper electrodes 141 and 142 and the body 101 may be smaller than the area of contact between the lower electrodes 131 and 132 and the body 101. In contrast, the thickness t2 of the upper electrodes 141 and 142 may be thicker than the thickness t1 of the lower electrodes 131 and 132. Therefore, the upper electrodes 141 and 142 may have different shapes from those of the lower electrodes 131 and 132, but have a volume similar to that of the lower electrodes 131 and 132. In addition, the upper electrodes 141 and 142 may have substantially the same volume as that of the lower electrodes 131 and 132 by adjusting the area of contact with the body 101, the thickness thereof, or the like. However, in order to obtain an effect of the present disclosure, it is not necessary to require the volumes of the upper electrodes 141 and 142 and the lower electrodes 131 and 132 to be the same as each other.

In a case in which the lower electrodes 131 and 132 are provided as the mounting regions, even though electrodes are not formed on an upper portion of the body 101, the capacitor component 100 may operate, but since the electrodes 131 and 132 are formed only on a lower portion of the body 101, bending properties of the upper and lower portions of the body 101 may be different from each other. Therefore, warpage may occur in the capacitor component 100 mounted on the board, or the like, such that reliability may be decreased due to a decrease in adhesion strength with the board, or the like, may occur.

According to the present exemplary embodiment, an effect of suppressing warpage may be implemented by applying the upper electrodes 141 and 142, and the upper and lower portions of the capacitor component 100 may be easily distinguished by allowing the shapes of the upper electrodes 141 and 142 and the lower electrodes 131 and 132 to be different from each other. Further, the upper electrodes 141 and 142 and the lower electrodes 131 and 132 may have volumes similar to each other while having different shapes from each other, such that the bending properties in the upper and lower portions of the capacitor component 100 may become uniform. Therefore, in a case of using an electrode structure according to the present exemplary embodiment, occurrence of warpage of the capacitor component 100 may be decreased, such that reliability may be improved at the time of mounting the capacitor component on a board, or the like.

In detail, the area of contact between the upper electrodes 141 and 142 and the body 101 may be different from the area of contact between the lower electrodes 131 and 132 and the body 101 as illustrated in FIGS. 2, 4, and 5. That is, the area of contact between the upper electrodes 141 and 142 and the body 101 may be smaller than the area of contact between the lower electrodes 131 and 132 and the body 101, which is based on a case in which the lower electrodes 131 and 132 are provided as the mounting regions, and this area condition may be changed depending on a mounting direction. In this case, as illustrated in FIG. 2, in order to satisfy the same volume condition, the thickness of the upper electrodes 141 and 142 may be thicker than the thickness of the lower electrodes 131 and 132 (t1<t2).

In view of a shape, surfaces of the lower electrodes 131 and 132 contacting the body 101 may have a tetragonal shape as illustrated in FIG. 4. In addition, as illustrated in FIG. 5, surfaces of the upper electrodes 141 and 142 contacting the body 101 may have a circular shape, and sizes of the upper electrodes 141 and 142 may be larger than the connection electrodes 121 and 122 so as to stably cover the connection electrodes 121 and 122.

Figure 6:
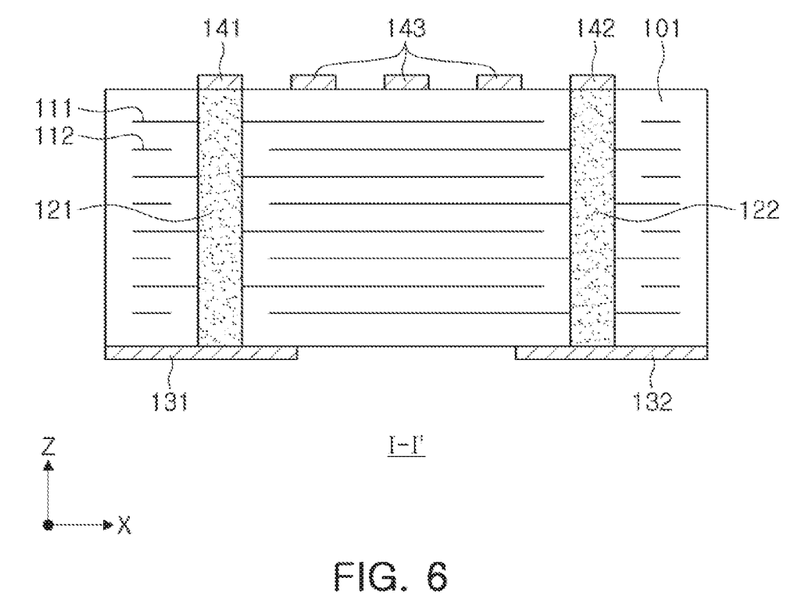
FIGS. 6 through 8 illustrate modified examples of the upper electrode in the exemplary embodiment illustrated in FIG. 1.
Figure 7:
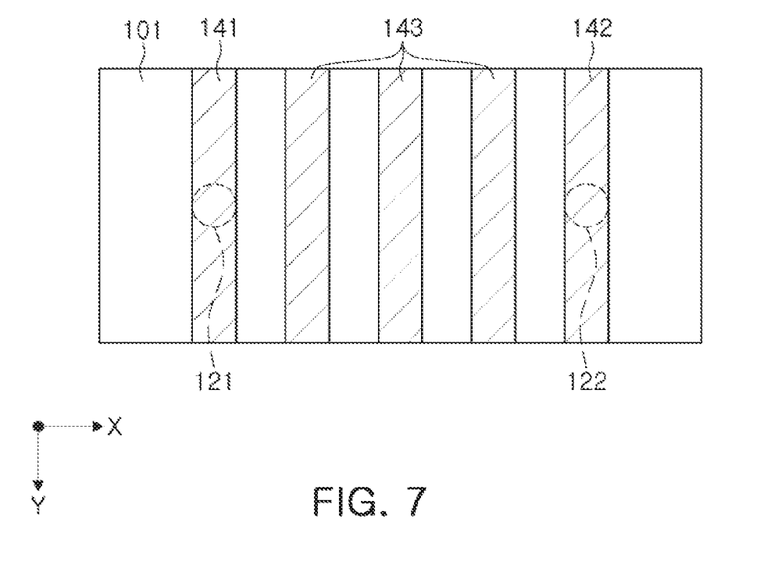
Figure 8:
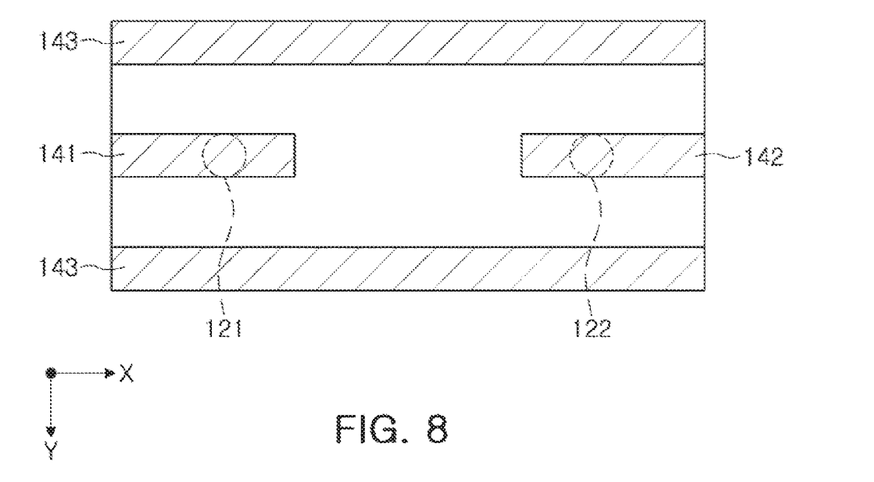

FIGS. 6 through 8 illustrate modified examples of the upper electrode in the exemplary embodiment illustrated in FIG. 1.

Referring to the modified examples in FIGS. 6 through 8, upper electrodes 141 to 143 may be formed in a stripe shape, and an orientation of the stripe may be the same as an orientation of the lower electrodes 131 and 132 (FIGS. 6 and 7) or different from the orientation of the lower electrodes 131 and 132 (FIG. 8). In the modified example, the upper electrodes 141 to 143 may include upper electrodes 141 and 142 electrically connected to the connection electrodes 121 and 122 and a dummy electrode 143 that is not electrically connected to the connection electrodes 121 and 122. Unlike the previous exemplary embodiment, the upper electrodes 141 and 142 may have substantially the same width as that of the connection electrodes 121 and 122. However, this is not essential in the present disclosure.

Shapes of the upper electrodes 141 to 143 and the lower electrodes 131 and 132 may be different from each other, but an area of contact between upper electrodes 141 to 143 and the body 101 may be the same as an area of contact between the lower electrodes 131 and 132 and the body 101. Further, a thickness of the upper electrodes 141 to 143 may be the same as that of the lower electrodes 131 and 132. Therefore, a volume of the upper electrodes 141 to 143 may be the same as that of the lower electrodes 131 and 132, upper and lower portions of the capacitor component may be clearly distinguished as described above, and bending properties thereof may be improved.

As set forth above, according to exemplary embodiments in the present disclosure, a capacitor component having improved distinguishability and miniaturizability and having excellent bending properties at the time of mounting the capacitor component on a board, or the like, may be obtained.

While exemplary embodiments have been shown and described above, it will be apparent to those skilled in the art that modifications and variations could be made without departing from the scope of the present invention as defined by the appended claims.

What is claimed is:

1. A capacitor component comprising:
   a body;
   first and second internal electrodes disposed in a thickness direction in the body;
   first and second connection electrodes penetrating the body in the thickness direction and electrically connected to the first and second internal electrodes, respectively;
   first and second upper electrodes disposed spaced apart from each other on an upper surface of the body, and electrically connected to the first and second connection electrodes, respectively; and
   first and second lower electrodes disposed spaced apart from each other on a lower surface of the body and electrically connected to the first and second connection electrodes, respectively, the upper surface and the lower surface opposing each other in the thickness direction,
   wherein a thickness of the first and second upper electrodes is different from that of the first and second lower electrodes, and an area of contact between the first and second upper electrodes and the body is different from an area of contact between the first and second lower electrodes and the body.

2. The capacitor component of claim 1, wherein the area of contact between the first and second upper electrodes and the body is smaller than the area of contact between the first and second lower electrodes and the body.

3. The capacitor component of claim 1, wherein a surface of each of the first and second lower electrodes contacting the body has a rectangular shape.

4. The capacitor component of claim 1, wherein a surface of each of the first and second upper electrodes contacting the body has a circular shape.

5. The capacitor component of claim 1, wherein the first and second upper electrodes and the first and second lower electrodes are formed of the same material.

6. The capacitor component of claim 1, wherein the first and second upper electrodes have a stripe shape.

7. The capacitor component of claim 1, further comprising a dummy electrode disposed on the upper surface of the body and not electrically connected to the first and second connection electrodes.

8. The capacitor component of claim 1, wherein the first and second internal electrodes are disposed alternately.

9. The capacitor component of claim 1, wherein the second connection electrode penetrates through the first internal electrodes but is not electrically connected to the first internal electrodes.

10. The capacitor component of claim 1, wherein the first connection electrode penetrates through the second internal electrodes but is not electrically connected to the second internal electrodes.

11. The capacitor component of claim 9, wherein the first internal electrodes include through-holes having a circular shape.

12. The capacitor component of claim 10, wherein the second internal electrodes include through-holes having a circular shape.

13. A capacitor component comprising:
a body;
a plurality of internal electrodes disposed in the body;
connection electrodes extended in a thickness direction of the body and electrically connected to the plurality of internal electrodes;
upper electrodes disposed on an upper surface of the body and electrically connected to the connection electrodes; and
lower electrodes disposed on a lower surface of the body and electrically connected to the connection electrodes,
wherein a thickness of the upper electrodes is different from that of the lower electrodes, and an area of contact between the upper electrodes and the body is different from an area of contact between the lower electrodes and the body, and
volumes of the upper and lower electrodes are the same as each other.

14. A capacitor component comprising:
a body;
a plurality of internal electrodes disposed in the body;
connection electrodes extended in a thickness direction of the body and electrically connected to the plurality of internal electrodes;
upper electrodes disposed on an upper surface of the body and electrically connected to the connection electrodes; and
lower electrodes disposed on a lower surface of the body and electrically connected to the connection electrodes,
wherein a thickness of the upper electrodes is greater than that of the lower electrodes, and an area of contact between the upper electrodes and the body is less than an area of contact between the lower electrodes and the body.

15. A capacitor component comprising:
a body;
a plurality of internal electrodes disposed in the body;
connection electrodes extended in a thickness direction of the body and electrically connected to the plurality of internal electrodes;
upper electrodes disposed on an upper surface of the body and electrically connected to the connection electrodes; and
lower electrodes disposed on a lower surface of the body and electrically connected to the connection electrodes,
wherein an area of contact between the upper electrodes and the body is the same as an area of contact between the lower electrodes and the body, and the upper and lower electrodes have different shapes from each other.

16. The capacitor component of claim 15, wherein thicknesses of the upper and lower electrodes are the same as each other.

17. The capacitor component of claim 15, wherein volumes of the upper and lower electrodes are the same as each other.

18. The capacitor component of claim 15, wherein the upper and lower electrodes have stripe shapes, and the upper electrodes are oriented in a first direction, and the lower electrodes are oriented in a direction different from the first direction.

19. A capacitor component comprising:
a body;
first and second internal electrodes disposed in a thickness direction in the body;
first and second connection electrodes penetrating the body in the thickness direction and electrically connected to the first and second internal electrodes, respectively;
first and second upper electrodes disposed spaced apart from each other on an upper surface of the body, and electrically connected to the first and second connection electrodes, respectively;
first and second lower electrodes disposed spaced apart from each other on a lower surface of the body and electrically connected to the first and second connection electrodes, respectively, the upper surface and the lower surface opposing each other in the thickness direction; and
a dummy electrode disposed on the upper surface of the body and not electrically connected to the first and second connection electrodes.

20. The capacitor component of claim 19, wherein the capacitor component does not include a dummy electrode disposed on the lower surface of the body and not electrically connected to the first and second connection electrodes.

* * * * *